(12) United States Patent
Kim et al.

(10) Patent No.: US 10,480,898 B2
(45) Date of Patent: Nov. 19, 2019

(54) LOW-SHOCK SEPARATION DEVICE

(71) Applicant: AGENCY FOR DEFENSE DEVELOPMENT, Daejeon (KR)

(72) Inventors: Dong-Jin Kim, Daejeon (KR); Zaeill Kim, Daejeon (KR); Nam-Choon Kim, Cheonan-si (KR); Yeung-Jo Lee, Daejeon (KR); Jeong-Min Cha, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 166 days.

(21) Appl. No.: 15/893,823

(22) Filed: Feb. 12, 2018

(65) Prior Publication Data
US 2019/0249951 A1    Aug. 15, 2019

(51) Int. Cl.
*F16B 31/00*    (2006.01)
*F41F 3/052*    (2006.01)

(52) U.S. Cl.
CPC .............. *F41F 3/052* (2013.01); *F16B 31/00* (2013.01); *F16B 31/005* (2013.01)

(58) Field of Classification Search
CPC ........... F41F 3/052; F42B 3/006; F16B 31/00; F16B 31/005; F16K 13/06; B23D 15/145

USPC .......................................... 411/390, 391, 434
See application file for complete search history.

(56) References Cited

U.S. PATENT DOCUMENTS

| | | | | |
|---|---|---|---|---|
| 3,449,996 A * | 6/1969 | Takahashi | ............... | F16B 4/002 411/391 |
| 3,520,223 A * | 7/1970 | Lilly | ........................ | F16B 4/002 411/390 |
| 3,546,999 A * | 12/1970 | Hosang | .................. | F16B 31/005 89/1.14 |
| 6,352,397 B1 * | 3/2002 | O'Quinn | ................ | B64G 1/645 411/270 |
| 6,629,486 B2 * | 10/2003 | Forys | ..................... | B64G 1/641 411/434 |
| 7,001,127 B2 * | 2/2006 | Tuszynski | .............. | B64G 1/645 411/433 |
| 7,114,427 B1 * | 10/2006 | Avetisian | ............... | F16B 31/005 89/1.14 |
| 7,862,282 B2 * | 1/2011 | Smith | .................... | F16B 31/005 411/433 |
| 8,710,385 B2 * | 4/2014 | Sickels | ................... | F42D 1/045 200/82 R |

* cited by examiner

*Primary Examiner* — Roberta S Delisle
(74) *Attorney, Agent, or Firm* — LRK Patent Law Firm

(57) ABSTRACT

A low-shock separation device is characterized in that an internal locking structure is unlocked and a bolt is separated by operating a specific part of components thereof using high pressure that is generated by combustion of powder.

7 Claims, 6 Drawing Sheets

LOW-SHOCK SEPARATION DEVICE

BACKGROUND OF THE INVENTION

1. Technical Field

The present invention relates to a low-shock separation device that can secure reliability when separating a structure of which the lifespan is almost ended from a main equipment without adverse influence under a high altitude environment.

2. Description of the Related Art

A separation device is a necessary part that is used for various purposes such as launching, controlling, driving, and separating in the fields related to various guided weapons and the aerospace industry.

A separation device that is the mostly used now is an explosive bolt.

For example, guided weapons are carried on launchers protecting and preventing guided missiles etc. from being exposed to the external environment, and the guided missiles mounted on the launchers should be firmly fixed to the launchers when being carried and should be separated on time in operations. To this end, explosive bolts having high structural stability and quick separation response are generally used.

According to the explosive bolts, a bolt is cut by explosive power of powder and the part fastened by the bolt is separated, but such separation is accompanied by flame, strong vibration, and pyroshock.

Accordingly, recently, there is a need for a separation device that can secure reliability when separating a structure of which the lifespan is almost ended from a main equipment without adverse influence under a high altitude environment by expanding the ranges of guided weapons.

SUMMARY OF THE INVENTION

An object of the present invention is to provide a low-shock separation device that separates components, using not the explosive power that is generated by explosion of powder, but high pressure that is generated by combustion of powder, and uses high pressure that is generated when a compression cartridge is operated to minimize impact that is generated by shock between components in separating.

In order to achieve the objects of the present invention, a low-shock separation device includes: a housing having open top and bottom and an internal receiving space; a cylinder disposed in the receiving space through the top of the housing and having a top hole and a bottom hole communicating with the top hole and larger in cross-sectional area than the top hole; a housing cap fitted in a space between the housing and the cylinder and closing the top of the housing by being; a piston disposed in the bottom hole of the cylinder; a pressure cartridge partially inserted in the top hole and closing an upper end of the top hole; a bolt partially inserted in the bottom hole through the bottom of the housing, closing a lower end of the bottom hole, and kept in the bottom hole by a holder; and a passage being formed when the cylinder is moved toward the pressure cartridge by high pressure that is generated when the pressure cartridge is operated, to attenuate a collision between the cylinder and the housing cap by filling a space between the cylinder and the housing cap with high pressure gas.

The passage may have a first passage formed around a side of the cylinder and a second passage having a first end communicating with the top hole of the cylinder and a second end extending from a top to a side of the piston to communicate with the first passage of the cylinder.

The first passage may be formed at a position where the first passage can communicate with the second passage when the cylinder is moved.

The device may include a deformable portion formed on the housing cap, restricting movement of the cylinder before the pressure cartridge is operated, and primarily absorbing shock by compressively deforming when the pressure cartridge is operated and the cylinder is moved toward the pressure cartridge.

The speed of the cylinder moving toward the pressure cartridge due to the high pressure may be adjusted by adjusting a surface area of the deformable portion.

The degree of shock absorption may be adjusted by adjusting a material and shape of the deformable portion.

The holder may be a metallic or elastic body, may be partially inserted in an insertion hole formed on the bolt with the other portion supported inside a flange of the cylinder to keep the bolt in the bottom hole of the cylinder, and may unlock the bolt when the cylinder is moved toward the pressure cartridge.

According to the present invention, there is provided a low-shock structure in which the internal locking structure for components is unlocked not by the explosive power that is generated by explosion of powder, but by high pressure that is generated by combustion of powder, and the deformable portion of the housing cap primarily attenuates shock on the cylinder and the housing cap and secondarily attenuates a collision between the cylinder and the housing cap by filling the space between the cylinder and the housing cap with high pressure gas produced in the pressure cartridge.

Accordingly, it is possible to reduce unavoidable impact in separating, so it is possible to secure reliability, maintain quality, and ensure easily handling of the device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present invention will be described in detail with reference to the accompanying drawings.

A low-shock separation device of the present invention has been designed to have an operation mechanism that separates a bolt by unlocking an internal locking structure for components thereof using not the explosive power that is generated by explosion of powder, but high pressure that is generated by combustion of powder.

Figure 1:
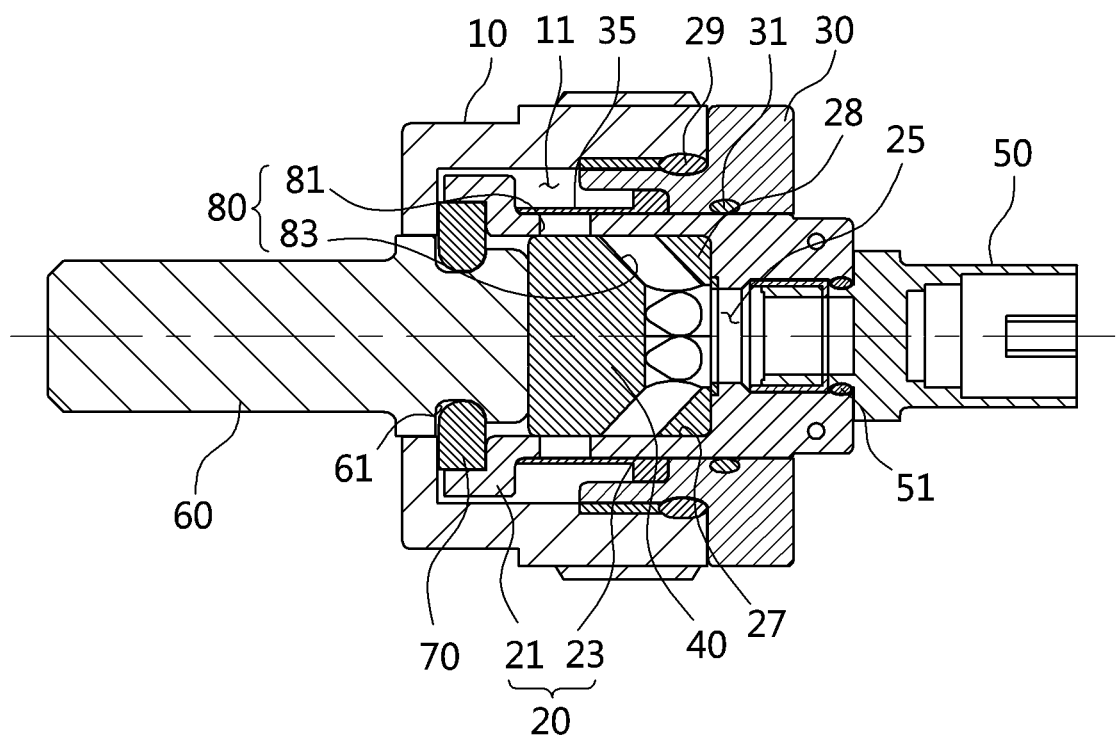
FIG. 1 is a cross-sectional view showing a low-shock separation device according to an embodiment of the present invention.

As shown in FIG. 1, the low-shock separation device includes a housing 10, a cylinder 20, a housing cap 30, a piston 40, a pressure cartridge 50, a bolt 60, and a passage 80.

The housing is formed substantially in a cylindrical shape with open top and bottom and an internal receiving space 11. The cylinder 20, the piston 40, the pressure cartridge 50, and the bolt 60 are partially inserted and combined in the receiving space 11, thereby forming an internal locking structure of the components.

The cylinder 20 is partially inserted in the internal space 11 through the top of the housing 10. The cylinder 20 has a flange 21 having an outer diameter corresponding to the inner diameter of the receiving space 11 and a cylinder body 23 having an outer diameter smaller then the outer diameter of the flange 21.

The gap between the housing 10 and the cylinder 20 is closed by fitting the housing cap 30, and O-rings 29 and 31 are disposed between the housing 10 and the housing cap 30 and between the housing cap 30 and the cylinder 20, respectively, thereby securing sealing.

A female thread and a male thread corresponding to the female thread are formed on the housing 10 and the housing cap 30, respectively, so that they can be thread-fastened to each other. The thread-fastening of the housing 10 and the housing cap 30 prevents the housing cap 30 from being separated from the housing 10 due to pressure that is generated when the cylinder 20 is moved toward the pressure cartridge 50.

The housing cap 30 has a deformable portion 35. The deformable portion 35 protrudes from the housing cap 30 and is brought in close contact with the outer side of the cylinder body 23 when the housing cap 30 is fitted into the gap between the housing 10 and the cylinder 20. The deformable portion 35 is positioned between the flange 21 and the housing cap 30 and is pressed and compressively deformed by the flange 21 that is moved toward the housing cap 30 when the cylinder 20 is moved toward the pressure cartridge 50.

The deformable portion 35 restricts movement of the cylinder 20 before the pressure cartridge 50 is operated, and it is compressively deformed and primarily absorbs shock when the pressure cartridge 50 is operated and the cylinder 20 is moved toward the pressure cartridge 50.

It is possible to adjust the speed of the cylinder 20, which is moved toward the pressure cartridge 50 by high pressure, by adjusting the surface area of the deformable portion 35. Further, it is possible to adjust the degree of shock absorption by adjusting the material and shape of the deformable portion 35.

The deformable portion may be made of metal that can absorb shock.

The deformable portion 35 may be formed separately from the housing cap 30 and then fitted on the outer side of the cylinder body 23 to be positioned between the flange 21 of the cylinder 20 and the housing cap 30. In this case, similarly, the deformable portion 35 restricts movement of the cylinder 20 before the pressure cartridge 50 is operated, and it is pressed compressively deformed by the flange 21 moving toward the housing cap 30 when the pressure cartridge 50 is operated and the cylinder 20 is moved toward the pressure cartridge 50.

The cylinder 20 has a top hole 25 open upward and a bottom hole 27 open downward, in which the top hole 25 communicates with the bottom hole 27 and the bottom hole 27 is larger in diameter than the top hole 25.

The position 40 is disposed in the bottom hole 27. A step 28 is formed at the joint of the top hole 25 and the bottom hole 27 due to the difference in diameter between the bottom hole 27 and the top hole 25, and the piston 40 cannot be moved toward the top hole 25 by the step 28. An O-ring (not shown) may be disposed between the inner side of the bottom hole 27 and the piston 40 to keep the bottom hole 27 hermetic toward the top hole 25.

The pressure cartridge 50 is partially inserted in the top hole 25 of the cylinder 20, thereby closing the top of the top hole 25. An O-ring 51 is disposed between the pressure cartridge 50 and the top hole 25 of the cylinder, thereby keeping the top hole 25 hermetic.

A male thread and a female thread corresponding to the male thread are formed on the outer side of the pressure cartridge 50 and the top hole 25 of the cylinder 20, so a portion of the pressure cartridge 50 can be thread-fastened in the top hole 25. This is for allowing the pressure cartridge 50 not to be separated from the cylinder 20, but to expand in the space between the pressure cartridge 50 and the piston 40 such that the cylinder 20 can move toward the pressure cartridge 50, when high-pressure gas is produced in the space between the pressure cartridge 50 and the piston 40.

The pressure cartridge 50 is filled with powder, and is operated and produces high-pressure gas when power is supplied. The cylinder 20 is moved toward the pressure cartridge 50 by the gas.

When power is supplied to the pressure cartridge 50, a heating wire generates heat, the heat ignites the powder being in close contact with the heating wire, and the powder ignites a charge, thereby being able to generate desired pressure. It is possible to adjust the desired pressure to be generated by adjusting the amount of the charge in order to obtain needed pressure.

The bolt 60 is partially inserted in the bottom hole 27 of the cylinder 20 through the bottom of the housing 10, thereby closing the lower end of the bottom hole 27.

An insertion hole 61 is formed on the bolt 60. A plurality of insertion holes 61 may be formed with regular intervals around the outer side of the bolt body 61.

A holder 70 is provided to keep the bolt 60 in the bottom hole 27 of the cylinder 20.

The holder 70 is partially inserted in the insertion hole 61 with the other portion supported on the flange 21 of the cylinder and keeps the bolt 60 in the bottom hole 27 of the cylinder 20. When the cylinder 20 is moved toward the pressure cartridge 50, the holder 70 is radially pushed and unlocks the hole 60, so the bolt 60 is separated.

In the present embodiment, the holder 70 may be a metallic body, an elastic body, or a metallic ball of which the portion inserted in the insertion hole 61 is formed in a spherical shape and the portion supported by the flange 21 is formed in a rectangular shape.

The housing 10, cylinder 20, housing cap 30, piston 40, pressure cartridge 50, and bolt 60 may be made of stainless steel to secure durability. However, the deformable portion 35 of the housing cap 30 is made of a metal that can absorb shock.

The passage 80 is formed when the cylinder 20 is moved toward the pressure cartridge by high pressure that is generated when the pressure cartridge is operated, and it attenuates a collision between the cylinder 20 and the housing cap 30 by filling the space between the cylinder 20 and the housing cap 30 with high pressure gas.

The passage 80 has a first passage 81 formed around the cylinder 20 and a second passage 83 formed on the piston 40 and extending from the top and the side of the piston 40 such that a first end communicates with the top hole 25 of the cylinder 20 and a second end communicates with the first passage 81 of the cylinder 20 when the cylinder 20 is moved.

The first passage 81 is formed at a position where it can communicate with the second passage 83 when the cylinder 20 is moved. The second passage 83 may be formed at an angle toward the first passage 81 so that the high pressure gas in the top hole 25 can smoothly move to the first passage 81.

The operation of the present invention is described hereafter.

The operation process of the low-shock separation device is described with reference to FIGS. 2 to 5.

When power is supplied to the pressure cartridge 50 filled with powder, the pressure cartridge 50 is operated, so the powder is burned and produces high-temperature and high-pressure gas.

Figure 2:
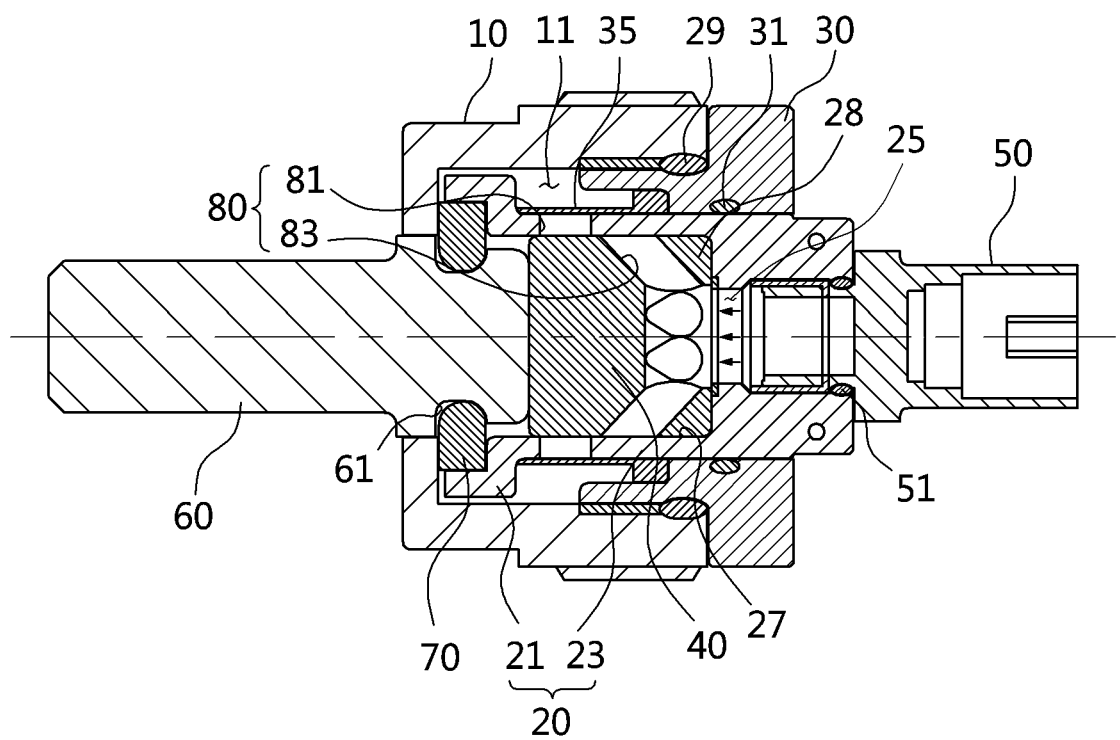
FIGS. 2 to 5 are views showing the operation process of the low-shock separation device according to an embodiment of the present invention.
Figure 3:
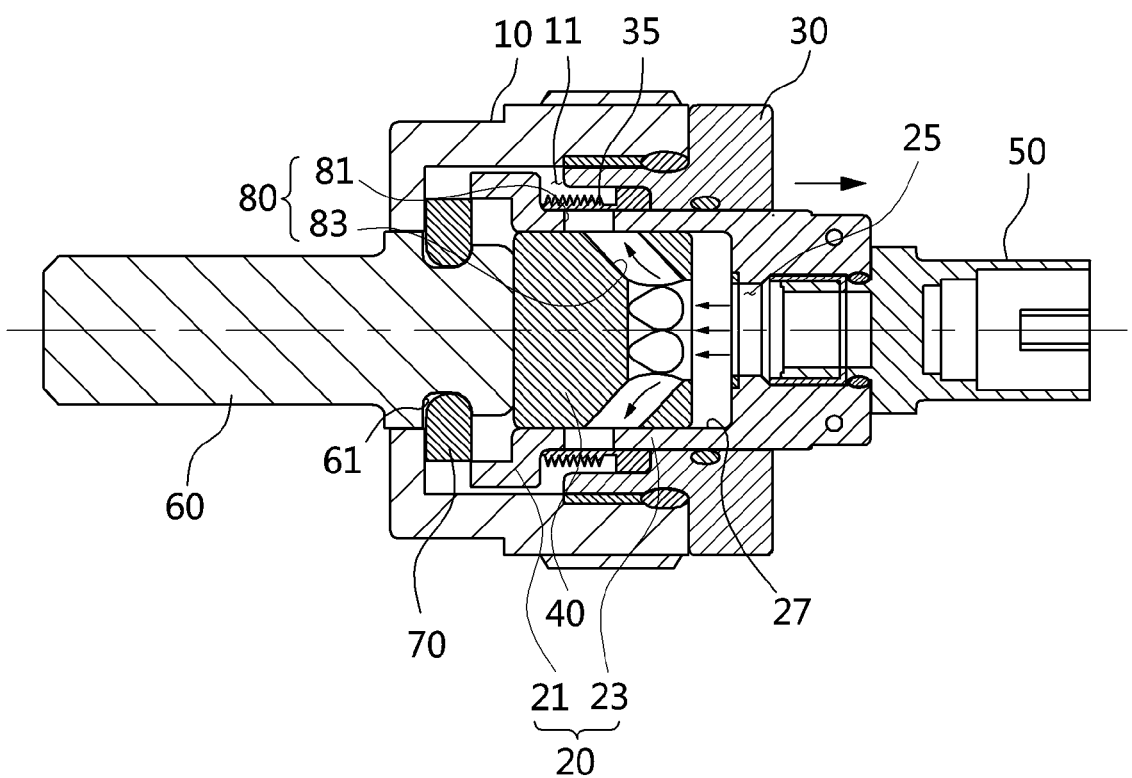

As shown in FIG. 2, the high-temperature and high-pressure gas is produced in the direction of an arrow in the top hole 25 of the cylinder 20, and by the gas, the space between the pressure cartridge 50 and the piston 40 is expanded, and as shown in FIG. 3, the cylinder 20 is moved toward the pressure cartridge 50.

As the cylinder 20 is moved toward the pressure cartridge 50, the deformable portion 35 restricting the cylinders 20 as a portion of the housing cap 30 is pressed and deformed by the flange 21 moving toward the housing cap 20, thereby primarily reducing the speed of the cylinder 20 moving toward the pressure cartridge 50.

Figure 4:
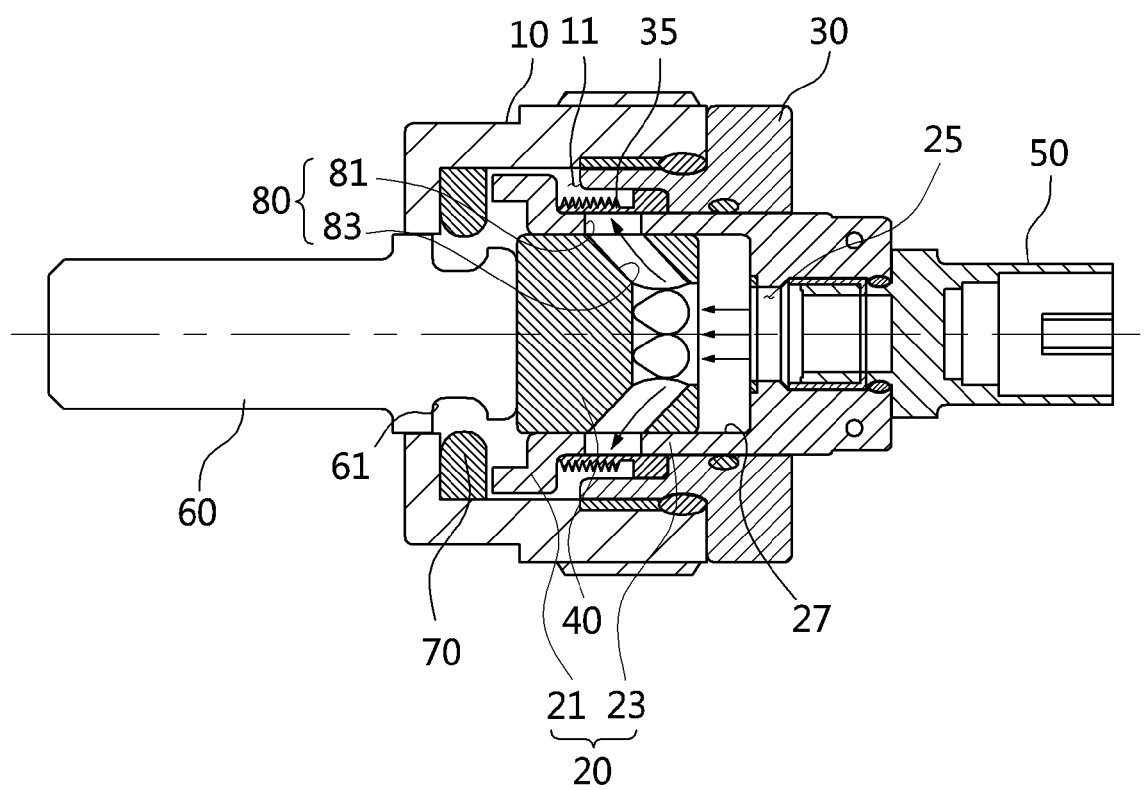

Further, as shown in FIG. 4, as the cylinder 20 is moved, the passage 80 through which high pressure generated in the cylinder 20 can be removed out of the cylinder 20 is formed, so the space between the cylinder 20 and the housing cap 30 is filled with the high pressure gas, thereby secondarily attenuating a collision between the cylinder 20 and the housing cap 30.

That is, as the cylinder 20 is moved toward the pressure cartridge 50, the first passage 81 of the cylinder 20 and the second passage 83 of the piston 40 communicate with each other and the high-temperature and high-pressure gas filled in the space between the pressure cartridge 50 and the piston 40 fills the space between the cylinder 20 and the housing cap 30 through the second passage 83 and the first passage 81, thereby reducing the movement speed of the cylinder 20.

Further, as the cylinder 20 is moved toward the pressure cartridge 50, an empty space is formed at the portion where the flange 21 of the cylinder 20 had been, and the holder 70 is pushed into the empty space and the bolt 60 restricted by the holder 70 is unlocked.

Figure 5:
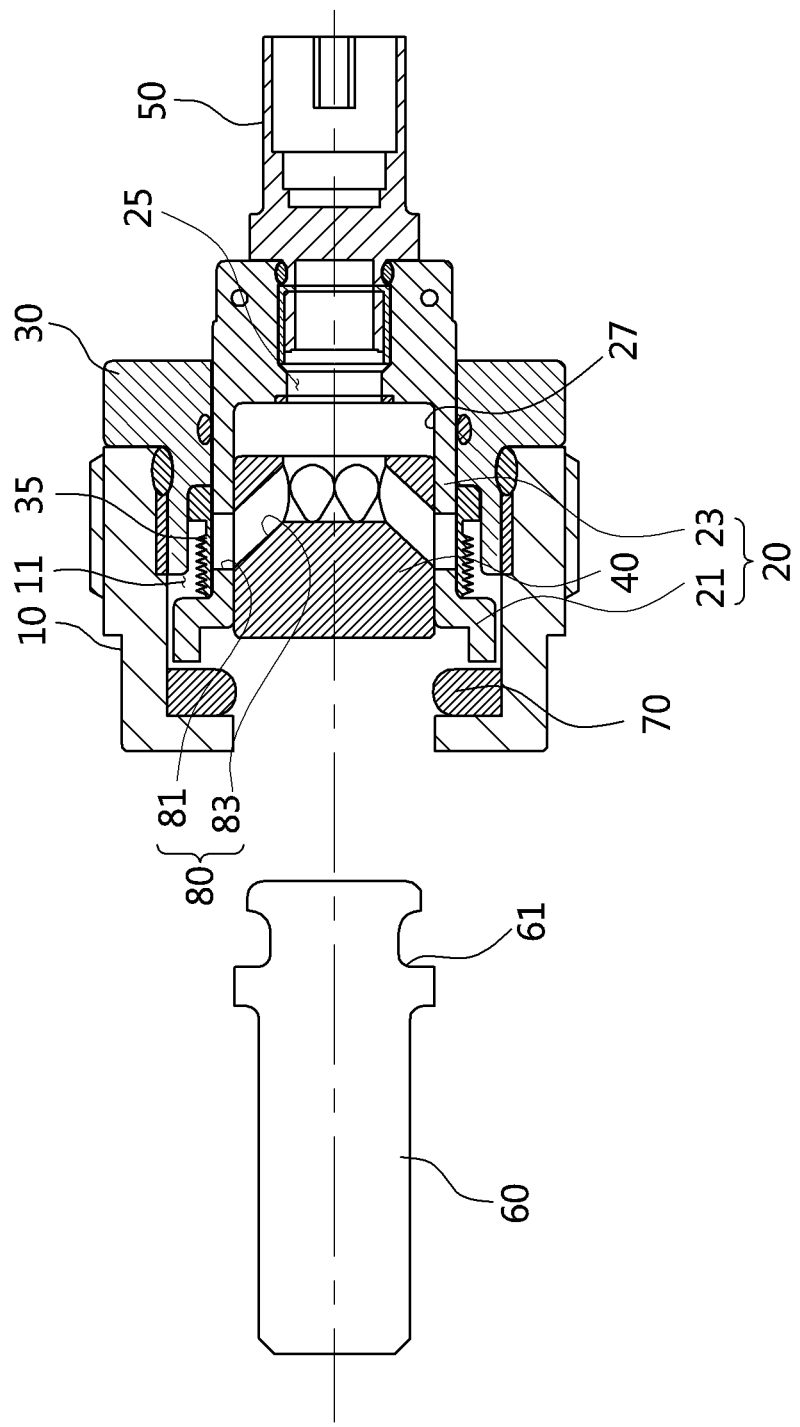

Further, the piston 40 is moved toward the bolt 60 by the high pressure generated in the pressure cartridge 50, so, as shown in FIG. 5, the bolt 60 can be easily separated from the housing 10.

Figure 6A:
FIGS. 6A and 6B are pictures respectively before and after the low-shock separation device according to an embodiment of the present invention is separated.
Figure 6B:

FIGS. 6A and 6B are pictures respectively before and after the low-shock separation device according to an embodiment of the present invention is separated.

As shown in FIGS. 6A and 6B, it can be seen the bolt is clearly separated without fragments.

According to the low-shock separation device, the internal locking structure is unlocked and a bolt is separated not by explosive power that is generated by explosion of powder, but by high pressure that is generated by combustion of powder, whereby shock is attenuated by high pressure when the bolt is separated, so a high shockwave and fragments are not generated. Further, it is possible to secure reliability, maintain the quality, and easily handle the device.

The present invention is not limited to the exemplary embodiments described above and defined by claims, and it is apparent to those skilled in the art that the present invention may be modified in various ways without departing from the scope of the present invention described in claims.

What is claimed is:

1. A low-shock separation device comprising:
   a housing having open top and bottom and an internal receiving space;
   a cylinder disposed in the receiving space through the top of the housing and having a top hole and a bottom hole communicating with the top hole and larger in cross-sectional area than the top hole;
   a housing cap fitted in a space between the housing and the cylinder and closing the top of the housing;
   a piston disposed in the bottom hole of the cylinder;
   a pressure cartridge partially inserted in the top hole and closing an upper end of the top hole; and
   a bolt partially inserted in the bottom hole through the bottom of the housing, closing a lower end of the bottom hole, and kept in the bottom hole by a holder,
   wherein a passage attenuating a collision between the cylinder and the housing cap is formed by filling a space between the cylinder and the housing cap with high pressure gas, and the passage is formed when the cylinder is moved toward the pressure cartridge by high pressure that is generated when the pressure cartridge is operated.

2. The device of claim 1, wherein the passage has a first passage formed around a side of the cylinder and a second passage having a first end communicating with the top hole of the cylinder and a second end extending from a top to a side of the piston to communicate with the first passage of the cylinder.

3. The device of claim 2, wherein the first passage is formed at a position where the first passage can communicate with the second passage when the cylinder is moved.

4. The device of claim 1, comprising a deformable portion formed on the housing cap, restricting movement of the cylinder before the pressure cartridge is operated, and primarily absorbing shock by compressively deforming when the pressure cartridge is operated and the cylinder is moved toward the pressure cartridge.

5. The device of claim 4, wherein speed of the cylinder moving toward the pressure cartridge due to the high pressure is adjusted by adjusting a surface area of the deformable portion.

6. The device of claim 4, wherein the degree of shock absorption is adjusted by adjusting a material and shape of the deformable portion.

7. The device of claim 1, wherein the holder is a metallic or elastic body, is partially inserted in an insertion hole formed on the bolt with the other portion supported inside a flange of the cylinder to keep the bolt in the bottom hole of the cylinder, and unlocks the bolt when the cylinder is moved toward the pressure cartridge.

* * * * *